United States Patent
Noma et al.

(10) Patent No.: US 8,844,273 B2
(45) Date of Patent: Sep. 30, 2014

(54) EXHAUST GAS PURIFICATION SYSTEM OF WORKING MACHINE

(75) Inventors: Yasuo Noma, Osaka (JP); Taichi Togashi, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 46 days.

(21) Appl. No.: 13/695,898

(22) PCT Filed: Apr. 28, 2011

(86) PCT No.: PCT/JP2011/060462
§ 371 (c)(1),
(2), (4) Date: Dec. 4, 2012

(87) PCT Pub. No.: WO2011/138929
PCT Pub. Date: Nov. 10, 2011

(65) Prior Publication Data
US 2013/0067895 A1    Mar. 21, 2013

(30) Foreign Application Priority Data
May 7, 2010   (JP) .................................. 2010-107348

(51) Int. Cl.
| | | |
|---|---|---|
| F01N 3/00 | (2006.01) | |
| F01N 3/02 | (2006.01) | |
| F01N 3/10 | (2006.01) | |
| F01N 3/20 | (2006.01) | |
| F02D 41/02 | (2006.01) | |
| F02D 29/02 | (2006.01) | |
| F01N 13/00 | (2010.01) | |
| F01N 3/023 | (2006.01) | |
| F02D 41/40 | (2006.01) | |
| F01N 11/00 | (2006.01) | |
| F02D 31/00 | (2006.01) | |

(52) U.S. Cl.
CPC .............. *F01N 3/023* (2013.01); *F01N 3/0231* (2013.01); *F02D 41/029* (2013.01); *F02D 41/402* (2013.01); *F01N 2550/04* (2013.01); *F02D 2200/101* (2013.01); *F01N 3/0235* (2013.01); *F01N 11/002* (2013.01); *F01N 3/103* (2013.01); *F02D 29/02* (2013.01); *F02D 31/001* (2013.01); *F01N 13/0097* (2013.01); *F01N 2240/36* (2013.01)
USPC ................... 60/295; 60/285; 60/286; 60/297; 60/311

(58) Field of Classification Search
USPC ............................ 60/285, 286, 295, 297, 311
See application file for complete search history.

(56) References Cited

U.S. PATENT DOCUMENTS

| | | | |
|---|---|---|---|
| 2010/0095656 A1 | 4/2010 | Kamiya et al. | |
| 2010/0170227 A1* | 7/2010 | Tsukada et al. | ................. 60/286 |

FOREIGN PATENT DOCUMENTS

| | | |
|---|---|---|
| JP | 2000-145430 | 5/2000 |
| JP | 2003-027922 | 1/2003 |

(Continued)

OTHER PUBLICATIONS

Machine Translation JP 2010-77954.*

*Primary Examiner* — Thomas Denion
*Assistant Examiner* — Dapinder Singh
(74) *Attorney, Agent, or Firm* — Jordan and Hamburg LLP

(57) ABSTRACT

An exhaust gas purification device arranged in an exhaust system of an engine, and includes a renewing device for burning and removing a particulate matter within the exhaust gas purification device. The renewing device is operable in the case that a clogged state of the exhaust gas purification device is equal to or more than a prescribed level, wherein the exhaust gas purification system includes renewal admittance input means which allows an actuation of the renewing device, and rotating speed holding input means for holding a rotating speed of the engine to a predetermined rotating speed, and in the case that a turn-on operation of the rotating speed holding input means is carried out in a state in which an allowing operation of the renewal admittance input means is carried out, the rotating speed holding motion of the engine is executed in preference to an actuation of the renewing device.

5 Claims, 11 Drawing Sheets

(56) References Cited

FOREIGN PATENT DOCUMENTS

| JP | 2005-139944 | 6/2005 |
| JP | 2009-079501 | 4/2009 |
| JP | 2010-077954 | 4/2010 |
| JP | 2010-084686 | 4/2010 |
| WO | WO-2009/060719 | 5/2009 |

* cited by examiner

EXHAUST GAS PURIFICATION SYSTEM OF WORKING MACHINE

BACKGROUND OF THE INVENTION

The present invention relates to an exhaust; gas purification system of a working machine, for example, a construction machine, an agricultural machine and an engine generator.

In recent years, as an application of an emission control of a high order with regard to a diesel engine (hereinafter, refer simply to as an engine), it is going to be desired to mount an exhaust gas purification device which purifies an air pollutant in an exhaust gas, to a construction machine, an agricultural machine and an engine generator to which the engine is mounted. As the exhaust gas purification device, a diesel particulate filter (hereinafter, refer to as DPF) has been known (refer to Patent Documents 1 and 2). The DPF is provided for collecting a particulate matter (hereinafter, refer to as PM) or the like. In this case, if the PM which is collected by the DPF exceeds a prescribed amount, a distribution resistance within the DPF is increased and thereby causing a reduction of an engine output. Accordingly, it is also frequently carried out to remove the PM which is deposited in the DPF on the basis of a temperature rise of the exhaust gas so as to bring back a PM collecting capacity of the DPF (renew the DPF).

CITATION LIST

Patent Document 1: Japanese Patent Application Laid-open No. 2000-145430

Patent Document 2: Japanese Patent Application Laid-open No. 2003-27922

SUMMARY OF THE INVENTION

However, since it is necessary to enhance an exhaust gas temperature (apply a thermal energy to the exhaust gas) in the case the DPF is renewed in the conventional structure, a fuel consumption rate is increase to exceed an operating amount of an accelerator operating device such as a throttle lever and an accelerator pedal, thereby enlarging an engine output. Accordingly, since there are generated a shock and a change of an engine sound which are caused by a fluctuation of the engine output, an uncomfortable feeling is applied to an operator. It is impossible to deny a possibility that the operator misidentifies the sudden shock and the change of the engine sound as an abnormality. Particularly, in construction machine such as a hydraulic shovel which performs a careful work on the basis of the engine sound, the sudden shock and the change of the engine sound which are generated at a time of renewing the DPF are not preferable.

Accordingly, it is a technical object of the present invention is to provide an exhaust gas purification system of a working machine to which an improvement is applied by making a study of the actual condition mentioned above.

Solution to Problem

According to a first aspect of the invention, there is provided an exhaust gas purification system of a working machine including an engine which is mounted to the working machine, an exhaust gas purification device which is arranged in an exhaust system of the engine, and a renewing device for burning and removing a particulate matter within the exhaust gas purification device, and renewing device is operable in the case that a clogged state of the exhaust gas purification device is equal to or more than a prescribed level, wherein the exhaust gas purification system includes renewal admittance input means which allows an actuation of the renewing device, and rotating speed holding input means for holding a rotating speed of the engine to a predetermined rotating speed, and in the case that a turn-on operation of the rotating speed holding input means is carried out in a state in which an allowing operation of the renewal admittance input means is carried out, the rotating speed holding motion of the engine is executed in preference to an actuation of the renewing device.

According to a second aspect of the invention, there is provided the exhaust gas purification system of the working machine as recited in the first aspect, wherein the rotating speed holding motion of the engine is executed in a state in which an allowing operation of the renewal admittance input means is carried out.

According to a third aspect of the invention, there is provided the exhaust gas purification system of the working machine as recited in the second aspect, wherein in the case that the turn-on operation of the rotating speed holding input means is carried out under actuation of the renewing device, the actuation of the renewing device is stopped and the rotating speed holding motion of the engine is executed.

According to a fourth aspect of the invention, there is provided the exhaust gas purification system of the working machine as recited in the second or third aspect, wherein in the case that the clogged state of the exhaust gas purification device becomes equal to or more than a critical level exceeding the prescribed level under execution of the rotating speed holding motion of the engine, the rotating speed holding motion of the engine is stopped and the renewing device is actuated.

According to a fifth aspect of the invention, there is provided the exhaust gas purification system of the working machine as recited in the fourth aspect, further including renewal advance notifying means which is actuated in the case that the clogged state of the exhaust gas purification device becomes equal to or more than the critical level.

According to the invention of the first aspect, since the exhaust gas purification system includes the engine which is mounted to the working machine, the exhaust gas purification device which is arranged in the exhaust system of the engine, and the renewing device for burning and removing the particulate matter within the exhaust gas purification device, and the renewing device is operable in the case that the clogged state of the exhaust gas purification device is equal to or more than the prescribed level, and the exhaust gas purification system includes the renewal admittance input means which allows the actuation of the renewing device, and the rotating speed holding input means for holding the rotating speed of the engine to the predetermined rotating speed, and is in the case that the turn-on operation of the rotating speed holding input means is carried out in the state in which the allowing operation of the renewal admittance input means is carried out, the rotating speed holding motion of the engine is executed in preference to the actuation of the renewing device, it is possible to inhibit the renewing motion of the exhaust gas purification device by the turn-on operation of the rotating speed holding input means, even if the allowing operation of the renewal admittance input means is carried out. In addition, it is possible to hold the drive state of the engine at the rotating speed which is suitable for the careful work which the operator executes on the basis of the engine sound. In other words, it is possible to hold the drive state of the engine at the rotating speed which is suitable for the careful work, while inhibiting the renewing motion of the exhaust gas purification device, in accordance with the operator's intention depending on the working state of the working machine. Therefore, it is possible to smoothly carry out the careful work although it can execute a renewing control which recovers a particulate matter collecting capacity of the exhaust gas purification device. In other words, there can be achieved an effect that the careful work can be carried out in a concentrated manner by doing away with a defect of the exhaust gas purification device renewing motion which may obstruct the careful work.

According to the invention of the second aspect, in the exhaust gas purification system of the working machine as recited in the first aspect, since the rotating speed holding motion of the engine is executed in a state in which an allowing operation of the renewal admittance input means is carried out, the exhaust gas purification device renewing motion by the renewing device can be securely carried out only by turning off the rotating speed holding input means in the case that the clogged state of the exhaust gas purification device is equal to or more than the prescribed level. Accordingly, it is possible to significantly reduce an artificial mistake such as an operation miss of the renewal admittance input means, particularly at a time of the careful work, and there can be achieved an effect that it is possible to effectively prevent a problem that the exhaust gas purification device renewing motion is not executed due to the artificial miss and the exhaust gas purification device is clogged.

According to the invention of the third aspect, in the exhaust gas purification system of the working machine as recited in the second aspect, since in the case that the turn-on operation of the rotating speed holding input means is carried out under actuation of the renewing device, the actuation of the renewing device is stopped and the rotating speed holding motion of the engine is executed it is possible to easily change to the drive state of the engine which is suitable for the careful work, only by turning on the rotating speed holding input means, in the case that it is desirable to carry out the careful work even under operation of the renewing device. Accordingly, it is possible to accurately set the drive state of the engine depending on the working state (particularly the careful work) of the working machine, and there can be achieved an effect that it is possible to achieve an improvement of a workability although it can execute the renewing control of recovering the particulate matter collecting capacity of the exhaust gas purification device.

According to the invention of the fourth aspect, in the exhaust gas purification system of the working machine as recited in the second or third aspect, since in the case that the clogged state of the exhaust gas purification device becomes equal to or more than the critical level exceeding the prescribed level under execution of the rotating speed holding motion of the engine, the rotating speed holding motion of the engine is stopped and the renewing device is actuated, it is possible to smoothly change to the renewing motion of the exhaust gas purification device by the renewing device, without carrying out a return operation, for example, for changing a mode. Therefore, there can be achieved an effect that it is possible to securely avoid a state in which the particulate matter is excessively deposited in the exhaust gas purification device, while omitting a labor hour of the operation, so as to prevent a malfunction of the exhaust gas purification device and the engine which is caused by an excessive deposition of the particulate matter.

According to the invention of the fifth aspect, in the exhaust gas purification system of the working machine as recited in the fourth aspect, since there is provided the renewal advance notifying means which is actuated in the case that the clogged state of the exhaust gas purification device becomes equal to or more than the critical level, the operator can previously comprehend a fact of changing to the exhaust gas purification device renewing motion by the renewing device, on the basis of the actuation of the renewal advance notifying means, at a time of stopping the rotating speed holding motion of the engine, and it is possible to previously assume the shock of the output fluctuation and the change of the engine sound which are generated thereafter. Accordingly, there can be achieved an effect that it is possible to reduce the uncomfortable feeling of the operator which is caused by the renewing motion of the exhaust gas purification device.

DESCRIPTION OF THE PREFERRED EMBODIMENTS

A description will be given below of an embodiment which embodies the present invention on the basis of the accompanying drawings.
(1) Outline Structure of Backhoe First of all, a description will be given of an outline structure of a backhoe 141 which corresponds to one example of a working machine to which an engine 70 is mounted, with reference to FIG. 1 and FIG. 2. In this case, an illustration of a cabin 146 is omitted for convenience of explanation in FIG. 2.

Figure 1:
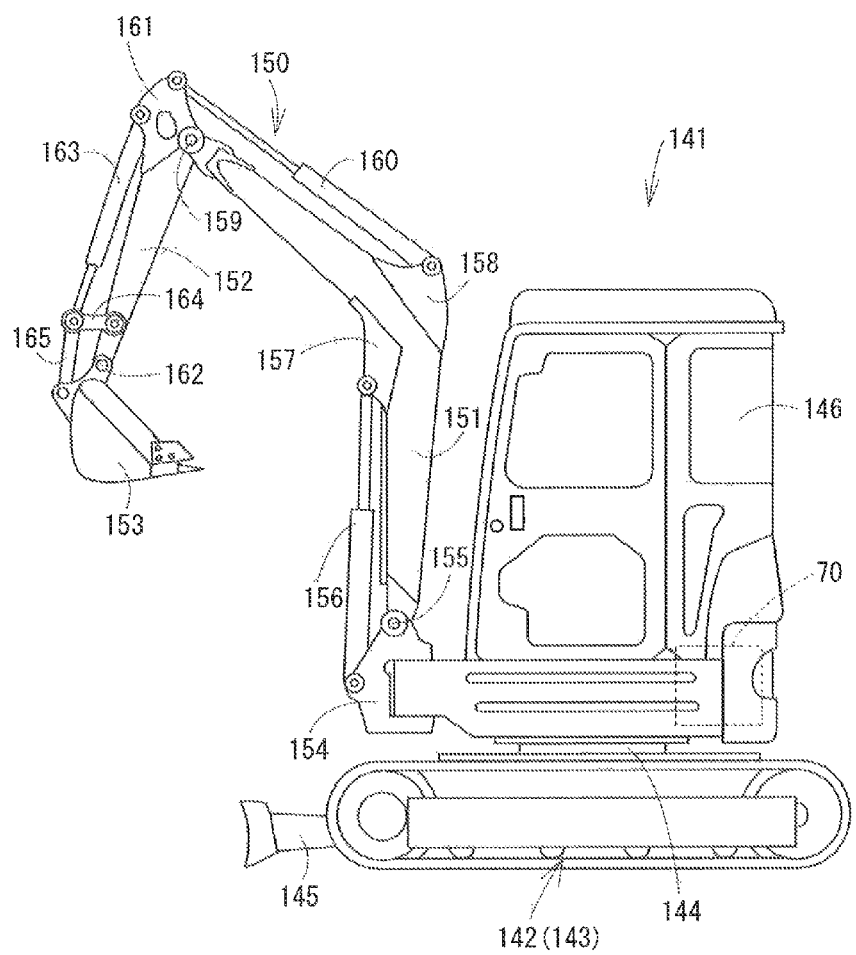
FIG. 1 is a side elevational view of a fork lift car to which an engine is mounted.

The backhoe 141 which corresponds to one example of the working machine is provided with a crawler type traveling device 142 which has a pair of right and left traveling crawlers 143 (only a left side is shown in FIG. 1), and a swing table 144 (a machine body) which is provided on the traveling device 142. The swing table 144 is structured so as to be horizontally swingable over all directions at 360 degrees by a swing motor (not shown). A blade 145 is installed to a front portion of the traveling device 142 so as to be movable up and down and rotatable.

The cabin 146 serving as the control portion and the diesel four-cylinder type engine 70 are mounted to the swing table 144. A front portion of the swing table 144 is provided with a working portion 150 which has a boom 151, an arm 152 and a bucket 153 for an excavating work. As in detail shown in FIG. 2, in an inner portion of the cabin 146, there are arranged a control seat 148 on which an operator seats, a throttle lever 166 serving as throttle operating means which sets and holds an output rotating speed of the engine 70, and lever switch groups 167 to 170 (a swing operating lever 167, an arm operating lever 168, as bucket operating switch 169 and a boom operating lever 170) which serve as working portion operating means.

The boom 151 which corresponds to a constituting element of the working portion 150 has a leading end side protruding forward and is formed as a shape which is bent like a V-shape as viewed from the side. A base end portion of the boom 151 is pivoted to a boom bracket 154 which is attached to a front portion of the swing table 144 so as to be swingable and rotatable around a transverse boom shaft 155. A boom cylinder 156 of a single rod double action type for swinging and rotating the boom 151 up and down is arranged in a side of an inner surface (a front face) of the boom 151. A cylinder side end portion of the boom cylinder 156 is pivoted rotatably to a front end portion of the boom bracket 154. A rod side end portion of the boom cylinder 156 is pivoted rotatably to a front bracket 157 which is fixed to a front face side (a concave side) of the bent portion in the boom 151.

A base end portion of the arm 152 having a longitudinally rectangular tube shape is pivoted to a leading end portion of the boom 151 so as to be swingable and rotatable around a transverse arm shaft 159. An arm cylinder 160 of a single rod double action type for swinging and rotating the arm 152 is arranged in a front portion side of an upper face of the boom 151. A cylinder side end portion of the arm cylinder 160 is pivoted rotatably to a rear bracket 158 which is fixed to a back face side (a protruding side) of the bent portion in the boom 151. A rod side end portion of the arm cylinder 160 is pivoted rotatably to an arm bracket 161 which is firmly fixed to an outer surface (a front face) in a base end side of the arm 152.

The bucket 153 which serves as an excavating attachment is pivoted to a leading end portion of the arm 152 so as to freely scoop and rotate around a transverse bucket shaft 162. In a side of an outer face (a front face) of the arm 152, there is arranged a bucket cylinder 163 of a single rod double action type for scooping and rotating the bucket 153. A cylinder side end portion of the bucket cylinder 163 is pivoted rotatably to the arm bracket 161. A rod side end portion of the bucket cylinder 163 is pivoted rotatably to the bucket 153 via a connection link 164 and a relay rod 165.

(2) Engine and Peripheral Structure of the Same

Next, a description will be given of the engine 70 and a peripheral structure of the same, with reference to FIG. 3 and FIG. 4. As shown in 4, the engine 70 is the four-cylinder type diesel engine as mentioned above, and is provided with a cylinder block 75 in which a cylinder head 72 is fastened to an upper face. An intake manifold 73 is connected to one side face of the cylinder head 72, and an exhaust manifold 71 is connected to the other side face. A common rail system 117 which supplies a fuel to each of cylinders of the engine 70 is provided below the intake manifold 73 in a side face of the cylinder block 75. An intake air throttle device 81 for regulating an intake air pressure (an amount of intake air) of the engine 70 and an air cleaner (not shown) are connected to an intake pipe 76 which is connected to an air intake upstream side of the intake manifold 73.

Figure 3A:
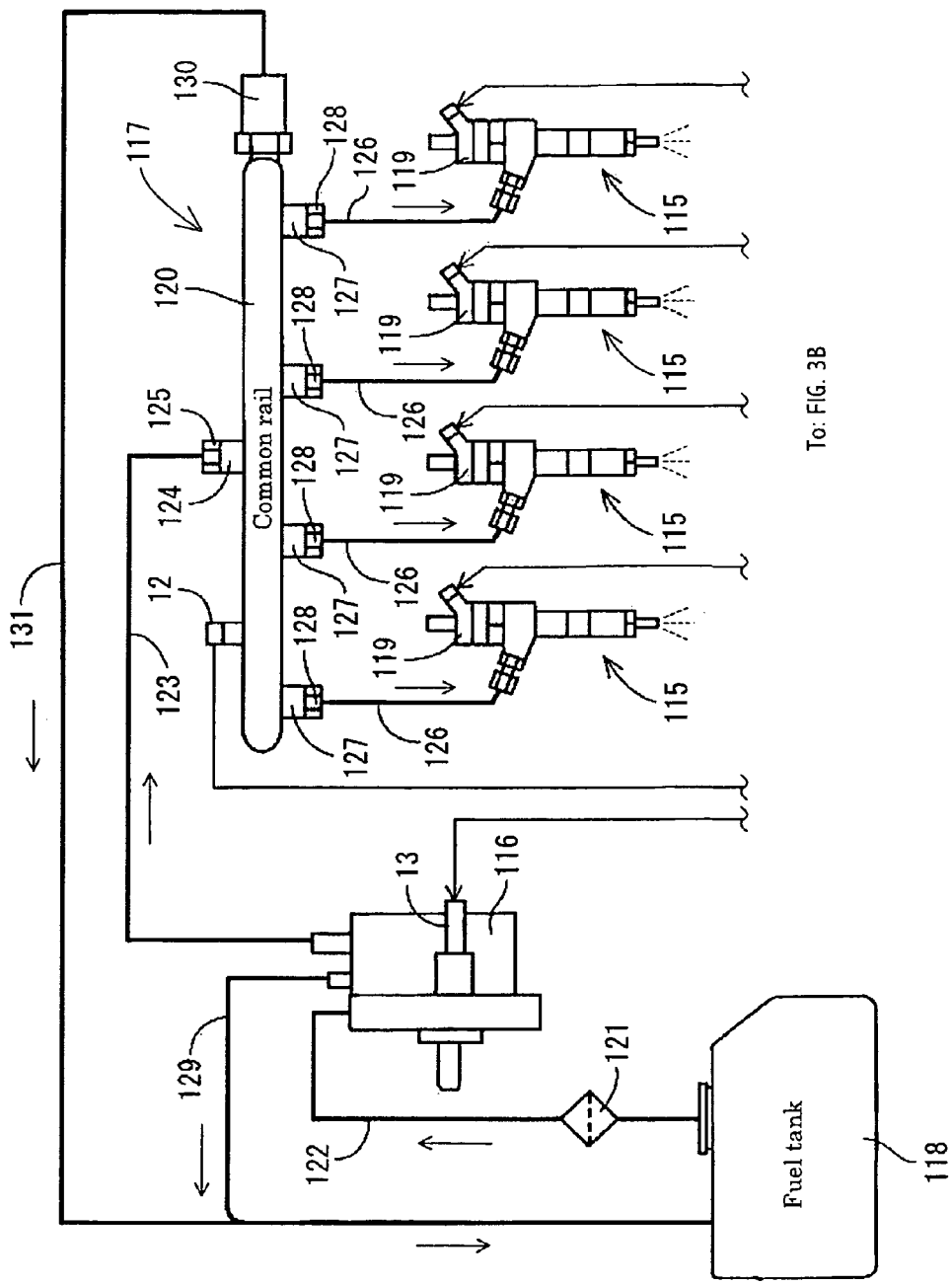
FIG. 3 is an explanatory view of a fuel system of the engine.
Figure 3B:
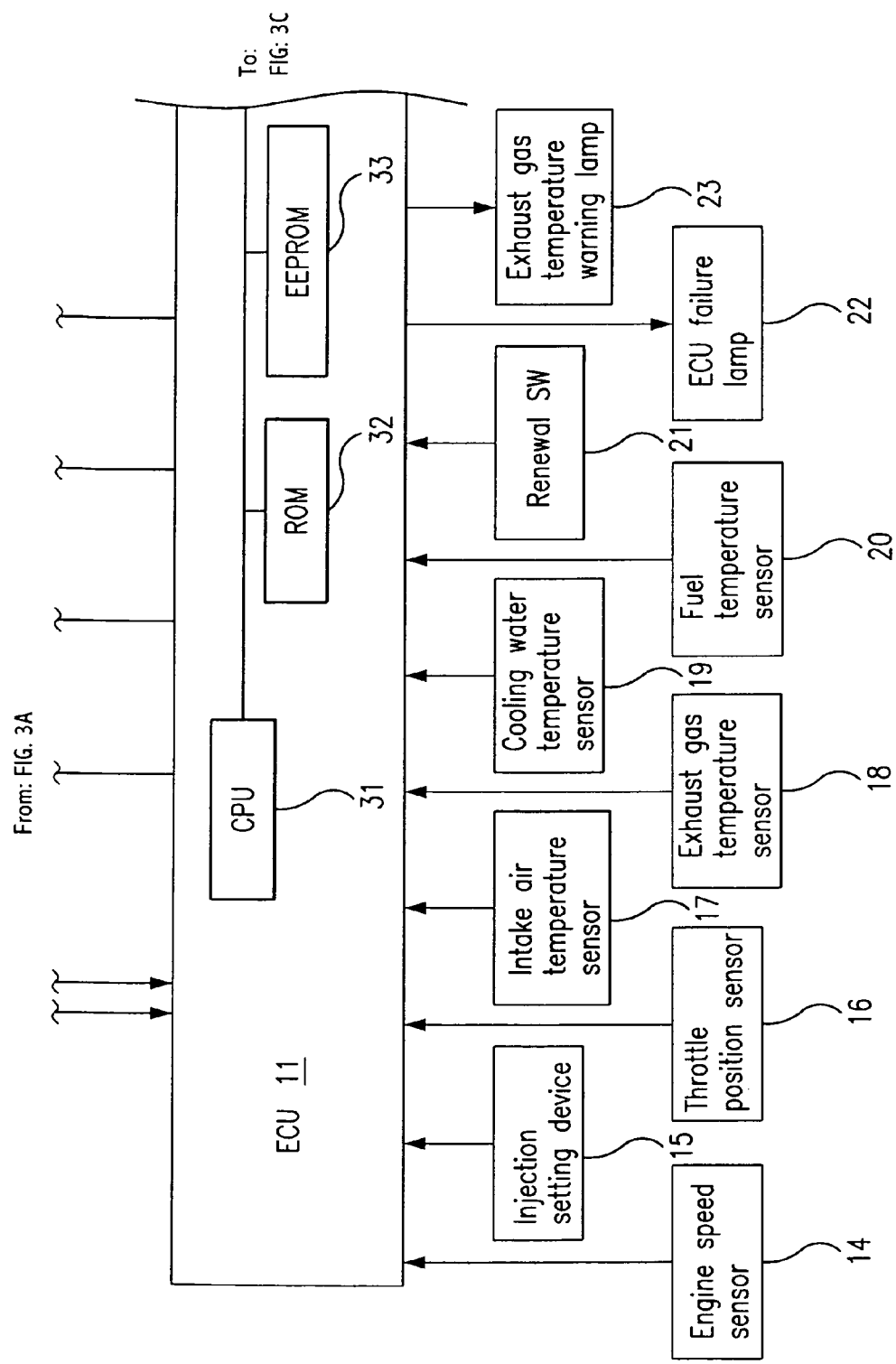
Figure 3C:
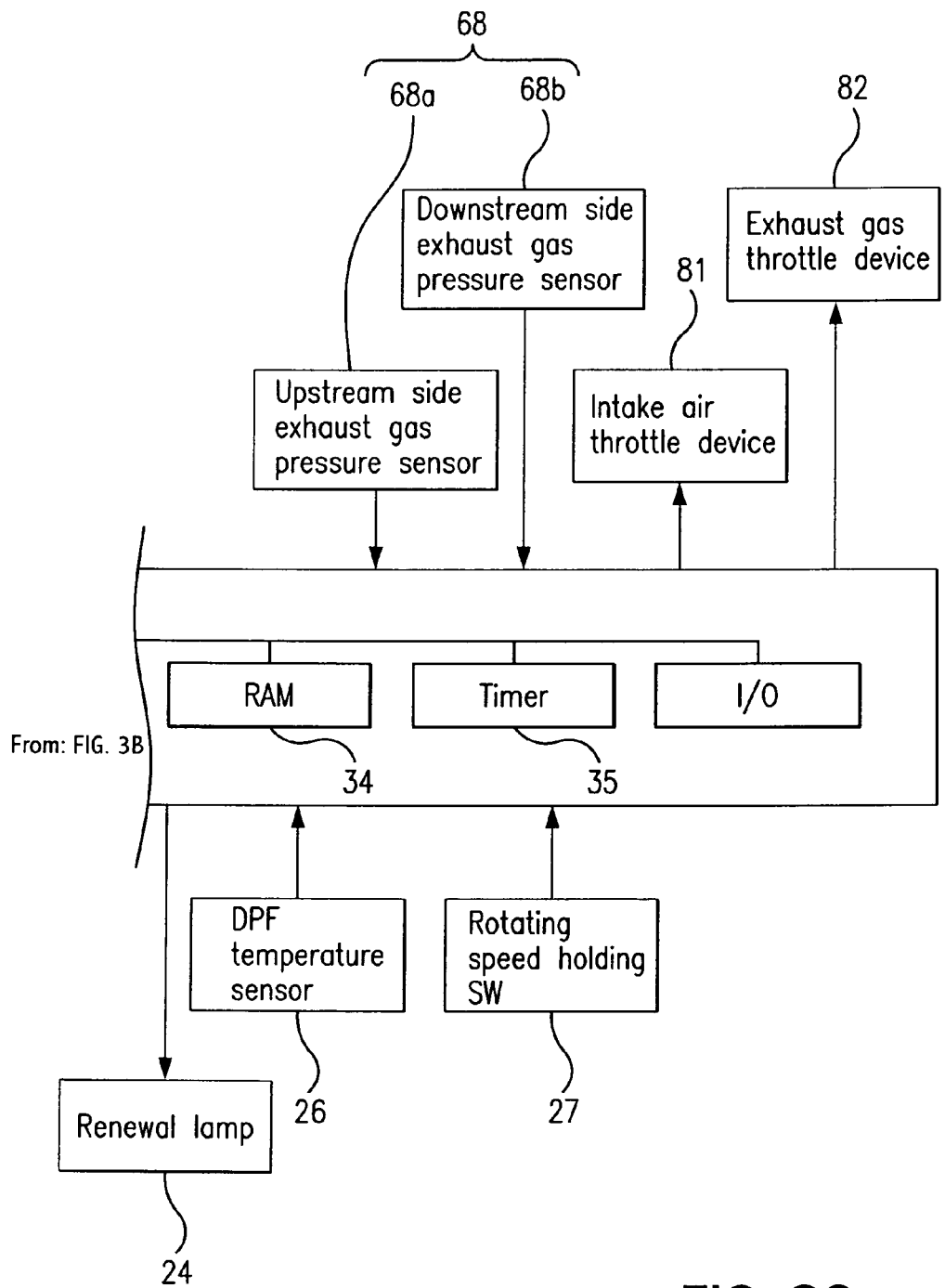
Figure 4:
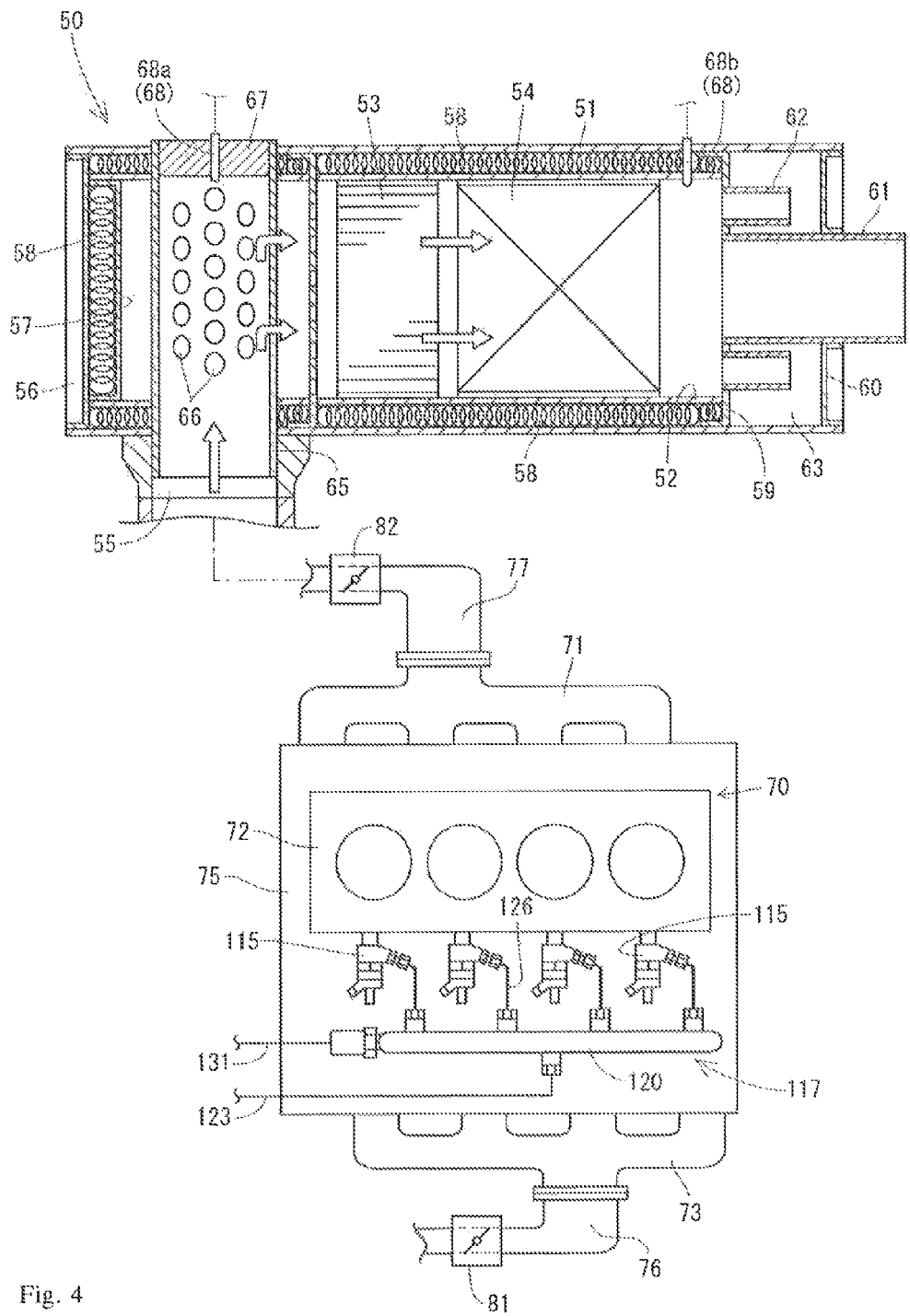
FIG. 4 is a function block diagram showing a relationship between the engine and an exhaust gas purification device.

As shown in FIG. 3, a fuel tank 118 is connected to each of injectors 115 for four cylinders in the engine 70 via a common rail system 117 and a fuel supply pump 116. Each of the injectors 115 is provided with a fuel injection valve 119 of an electromagnetically opening and closing control type. The common rail system 117 is provided with a cylindrical common rail 120. The fuel tank 118 is connected to an air intake side of the fuel supply pump 116 via a fuel filter 121 and a low pressure pipe 122. A fuel within the fuel tank 118 is sucked into the fuel supply pump 116 via the fuel filter 121 and the low pressure pipe 122. The fuel supply pump 116 of the embodiment is arranged in the vicinity of the intake manifold 73. On the other hand, the common rail 120 is connected to an air discharge side of the fuel supply pump 116 via a high pressure pipe 123. The injectors 115 for four cylinders are connected to the common rail 120 via four fuel injection pipes 126.

In the structure mentioned above, the fuel in the fuel tank 118 is pressure fed to the common rail 120 by the fuel supply pump 116, and the fuel having the high pressure is stored in the common rail 120. Each of the fuel injection valves 119 is controlled to be opened and closed, whereby the fuel having the high pressure within the common rail 120 is injected to each of the cylinders of the engine 70 from each of the injectors 115. In other words, an injection pressure, an injection timing, and an injection period (an injection amount) of the fuel which is supplied from each of the injectors 115 are controlled with a high precision. Accordingly, it is possible to reduce a nitrogen oxide (NOx) from the engine 70, and it is possible to reduce a noise vibration of the engine 70.

Figure 5:
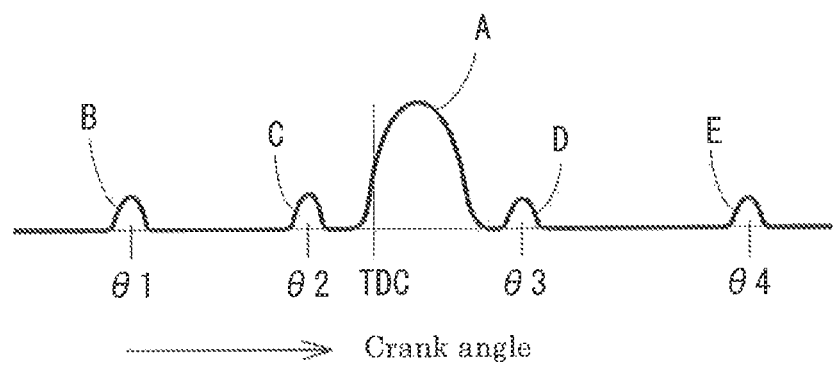
FIG. 5 is a view describing an injection timing of a fuel.

As shown in FIG. 5, the common rail system 117 is structured such as to execute a main injection A in the vicinity of a top dead center (TDC). Further, the common rail system 117 is structured such as to execute a small amount of pilot injection B for reducing the NOx and the noise at a moment of a crank angle $\theta 1$ which is about 60 degree before the top dead center, execute a pre injection C for reducing the noise at a moment of a crank angle $\theta 2$ which is just before the top dead center, and execute an after injection D and a post injection E for reducing a particulate matter (hereinafter, refer to as PM) and promoting a purification of the exhaust gas at a moment of crank angles $\theta 3$ and $\theta 4$ which are after the top dead center, in addition to the main injection A.

In this case, as shown in FIG. 3, the fuel supply pump 116 is connected to the fuel tank 118 via a fuel return pipe 129. A common rail return pipe 131 is connected to an end portion in a longitudinal direction of the cylindrical common rail 120 via a return pipe connector 130 which controls a pressure of the fuel within the common rail 120. In other words, a surplus fuel in the fuel supply pump 116 and a surplus fuel in the common rail 120 are recovered in the fuel tank 118 via the fuel return pipe 129 and the common rail return pipe 131.

To an exhaust pipe 77 which is connected to a downstream side of an exhaust gas in the exhaust manifold 71, there are connected an exhaust gas throttle device 82 for regulating an exhaust gas pressure of the engine 70, and a diesel particulate filter (hereinafter, refer to as DPF) 50 which corresponds to one example of the exhaust gas purification device. The exhaust gas discharged from each of the cylinders to the exhaust manifold 71 is discharged to an outside after being applied a purifying process via the exhaust pipe 77, the exhaust gas throttle device 82 and the DPF 50.

The DPF 50 is provided for collecting the PM or the like in the exhaust gas. The DPF 50 of the embodiment is structured such that a diesel oxidation catalyst 53, for example, a platinum or the like, and a soot filter 54 are arranged in series and accommodated in an approximately tubular filter case 52 within a casing 51 which is made of a heat resisting metal material. In the embodiment, the diesel oxidation catalyst 53 is arranged in an upstream side of the exhaust gas within the filter case 52, and the soot filter 54 is arranged in a downstream side of the exhaust gas. The soot filter 54 is formed as a honeycomb structure having a lot of cells which are sectioned by a porous (filterable) partition wall.

One side portion of the casing 51 is provided with an exhaust gas introduction port 55 which is communicated with the downstream side of the exhaust gas from the exhaust gas throttle device 82 among the exhaust pipe 77. One end portion of the casing 51 is occluded by a first bottom plate 56, and one end portion facing to the first bottom plate 56 among the filter case 52 is occluded by a second bottom plate 57. A heat insulating material 58 such as a glass wool is filled in an annular gap between the casing 51 and the filter case 52, and a gap between both the bottom plates 56 and 57, in such a manner as to surround a periphery of the diesel oxidation catalyst 53 and the soot filter 54. The other side portion of the casing 51 is occluded by two lid plates 59 and 60, and an approximately tubular exhaust gas discharge port 61 passes through both the lid plates 59 and 60. Further, a portion between both the lid plates 59 and 60 is a resonance chamber 63 which is communicated with an inner side of the filter case 52 via a plurality of communication pipes 62.

An exhaust gas introduction pipe 65 is inserted to the exhaust gas introduction port 55 which is formed in the one side portion of the casing 51. A leading end of the exhaust gas introduction pipe 65 protrudes to a side face in an opposite side to the exhaust gas introduction port 55 while cutting across the casing 51. A plurality of communication holes 66 which are open toward the filter case 52 are formed in an outer peripheral surface of the exhaust gas introduction pipe 65. A portion protruding to the side face in the opposite side to the exhaust gas introduction port 55 among the exhaust gas introduction pipe 65 is occluded by a lid body 67 which is detachably attached by screw thereto.

The DPF 50 is provided with a DPF temperature sensor 26 which detects a temperature of the exhaust gas within the DPF 50, as one example of detecting means. The DPF temperature sensor 26 of the embodiment is installed while passing through the casing 51 and the filter case 52, and a leading end of the DPF temperature sensor 26 is positioned between the diesel oxidation catalyst 53 and the soot filter 54.

Further, the DPF 50 is provided with a differential pressure sensor 68 which detects a clogged state of the soot filter 54, as one example of the detecting means. The differential pressure sensor 68 of the embodiment is structured such as to detect a pressure difference (a differential pressure) between upstream and downstream sides with respect to the soot filter 54 within the DPF 50. In this case, an upstream side exhaust gas pressure sensor 68a constructing the differential pressure sensor 68 is installed to the lid body 67 of the exhaust gas introduction pipe 65, and a downstream side exhaust gas pressure sensor 68b is installed between the soot filter 54 and the resonance chamber 63. It has been well known that a definite principle exists between the pressure difference between the upstream and downstream sides of the DPF 50, and a PM deposition amount within the DPF 50. In the embodiment, a renewing control (a DPF renewing control) of the soot filter 54 is executed by estimating the PM deposition amount within the DPF 50 from the pressure difference which is detected by the differential pressure sensor 68, and actuating the intake air throttle device 81 and the common rail 120 on the basis of the estimated result.

In this case, the clogged state of the soot filter 54 may be detected by an exhaust gas pressure sensor which detects the pressure in the upstream side of the soot filter 54 within the DPF 50, without being limited to the differential pressure sensor 68. In the case that, the exhaust gas pressure sensor is employed, the clogged state of the soot filter 54 is determined by comparing a pressure (a reference pressure) in the upstream side of the soot filter 54 under a brand-new state in which the PM is not deposited up in the soot filter 54, with the current pressure which is detected by the exhaust gas pressure sensor.

En the structure mentioned above, the exhaust gas from the engine 5 enters into the exhaust gas introduction pipe 65 via the exhaust gas introduction port 55, is spouted out into the filter case 52 from each of the communication holes 66 which are formed in the exhaust gas introduction pipe 65, is dispersed into a wide region within the filter case 52, and thereafter passes through the diesel oxidation catalyst 53 and the soot filter 54 in this order so as to be purified. The PM in the exhaust gas can not pass through the porous partition wall between the cells in the soot filter 54 at this stage, and is collected. Thereafter, the exhaust gas passing through the diesel oxidation catalyst 53 and the soot filter 54 is discharged from the exhaust gas discharge port 61.

If the temperature of the exhaust gas exceeds a renewal boundary temperature (for example, about 300° C.) at a time when the exhaust gas passes through the diesel oxidation catalyst 53 and the soot filter 54, NO (nitrogen monoxide) in the exhaust gas is oxidized into an unstable $NO_2$ (nitrogen dioxide) on the basis of an action of the diesel oxidation catalyst 53. Further, a PM collecting capacity of the soot filter 54 is recovered (the DPF 50 is renewed) by oxidation removing the PM which is deposited in the soot filter 54, with O (oxygen) that $NO_2$ discharges at a time of returning to NO.

(3) Structure Relevant to Control of Engine

Figure 6:
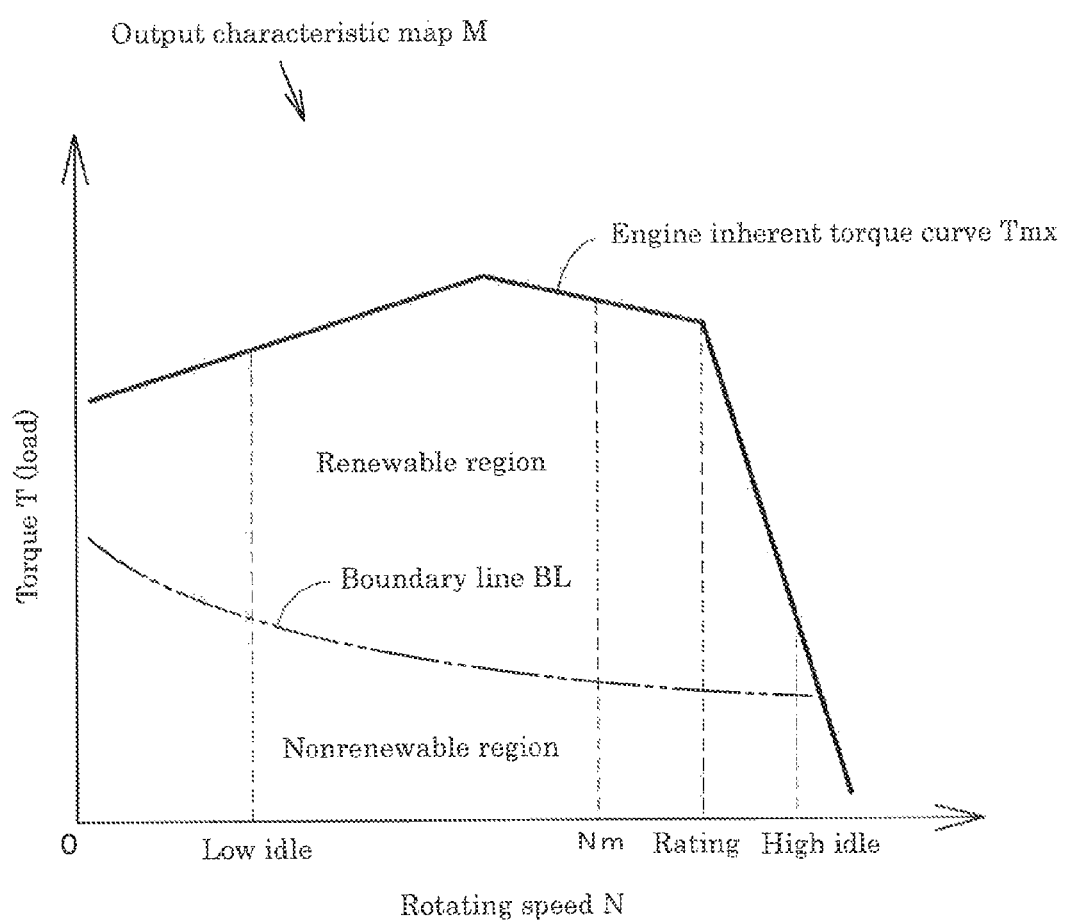
FIG. 6 is an explanatory view of an output characteristic map.

Next, a description will be given of a structure which is relevant to a control of the engine 70 with reference to FIG. 3, FIG. 6 and FIG. 7. As shown in FIG. 3, there is provided with an ECU 11 which actuates the fuel injection valve 119 in each of the cylinders in the engine 70. The ECU 11 has ROM 32 which previously stores various data in a fixed manner, EEPROM 33 which stores control programs and the various data in a rewritable manner, RAM 34 which temporarily stores the control programs and the various data, a timer 35 for measuring a time, and an input and output interface and the like, in addition to CPU 31 which executes various arithmetic processes and controls, and is arranged in the engine 70 or in the vicinity thereof.

To an input side of the ECU 11, there are connected at least a rail pressure sensor 12 which detects the fuel pressure within the common rail 120, an electromagnetic clutch 13 which rotates or stops the fuel pump 116, an engine speed sensor 14 which detects a rotating speed N of the engine 70 (a position of a cam shaft of a crank shaft), an injection setting device 15 which detects and sets a fuel injection frequency (a frequency in one stroke fuel injection period) of the injector 115, a throttle position sensor 16 which detects an operating position of a throttle lever 166, an intake air temperature sensor 17 which detects a temperature of the intake air in an intake air route, an exhaust gas temperature sensor 18 which detects a temperature of the exhaust gas in an exhaust gas route, a cooling water temperature sensor 19 which detects a temperature of a cooling water in the engine 70, a fuel temperature sensor 20 which detects a temperature of the fuel within the common rail 120, a renewal switch 21 serving as renewal admittance input means which selects whether a renewing motion of the DPF 50 can be carried out, the differential pressure sensor 68 (the upstream side exhaust gas pressure sensor 68a and the downstream side exhaust gas pressure sensor 68b), a DPF temperature sensor 26 which detects a temperature of the exhaust gas within the DPF 50, and a rotating speed holding switch 27 serving as rotating speed holding input means which holds the rotating speed N of the engine 70 at an intermediate rotating speed Nm.

Each of electromagnetic solenoids of the fuel injection valves 119 for at least four cylinders is connected to an output side of the ECU 11. In other words, it is structured such that the high-pressure fuel stored in the common rail 120 is injected from the fuel injection valve 119 separately at a plurality of times in one stroke while controlling a fuel injection pressure, an injection timing and an injection period, thereby suppressing the nitrogen oxide (NOx) from being generated, executing a complete combustion in which the generation of the PM and a carbon dioxide is reduced, and improving a fuel consumption.

Figure 2:
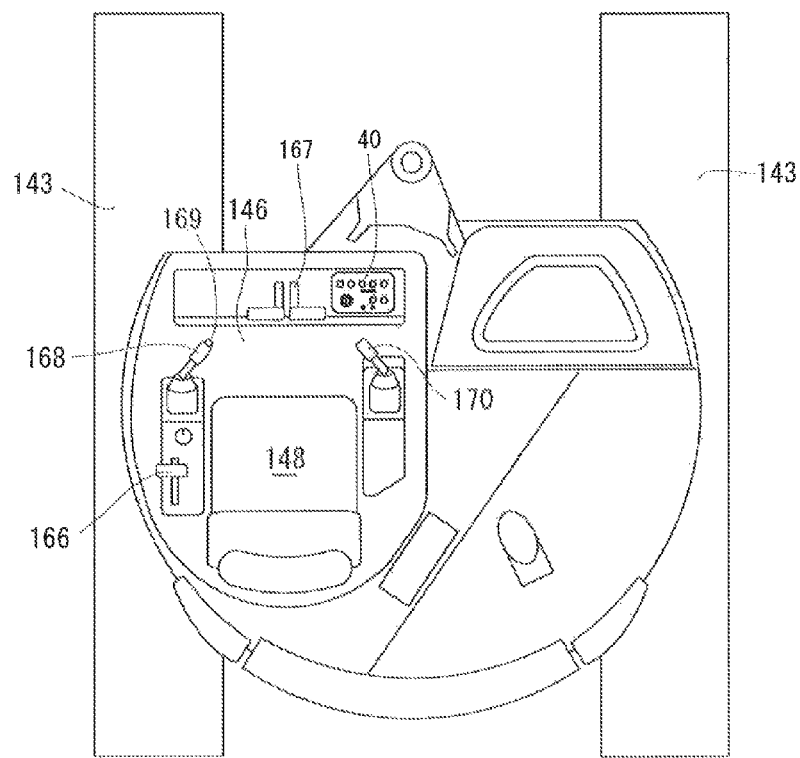
FIG. 2 is a plan view of the fork lift car.

Further, to an output side of the ECU 11, there are connected the intake air throttle device 81 for adjusting an intake air pressure (an intake air amount) of the engine 70, the exhaust gas throttle device 82 for adjusting an exhaust gas pressure of the engine 70, an ECU failure lamp 22 which gives a warning and informs of a failure of the ECU 11, an exhaust gas temperature warning lamp 23 serving as abnormally high temperature informing means which informs of an abnormally high temperature of the exhaust gas within the DPF 50, and a renewal lamp 24 which turns on with a renewing motion of the DPF 50. Data relating to blinking of each of the lamps 22 to 24 is previously stored in the EEPROM 33 of the ECU 11. Though details will be mentioned later, the renewal lamp 24 constructs a single display device serving as renewal advance notifying means which is actuated if the clogged state of the DPF 50 becomes equal to or more than a prescribed level or equal to or more than a critical level, and renewal informing means which informs of the matter that the DPF 50 is under renewing motion. In this case, as shown in FIG. 2 and FIG. 7, the renewal switch 21 and each of the lamps 22 to 24 are provided in an instrument panel 40 which is in a working machine (a backhoe 140) to be mounted with the engine 70.

The renewal switch 21 is of an alternate motion type. In other words, the renewal switch 21 is a lock type push switch which is locked at a push-down position by being pushed down once, and is returned to the original position by being pushed down once again. It is structured such as to be changeable to each of modes mentioned later, if the renewal switch 21 is locked at the push-down position at the blinking time of the renewal lamp 24 for informing of the matter that the clogged state of the DPF 50 reaches the prescribed level.

Further, the rotating speed holding switch 27 is of an alternate motion type in the same manner as the renewal switch 21. Though details will be mentioned later, it is structured such as to adjust an injection state (an injection pressure, an injection timing and an injection period) of the fuel to each of the cylinders on the basis of an electronic control of the common rail system 117 and hold the rotating speed. N of the engine 70 at the intermediate rotating speed Nm in preference to each of the modes mentioned later, if the rotating speed holding switch 27 is locked at the push-down position. In this case, the intermediate rotating speed Nm is a value between a low idle rotating speed (a lowest limit rotating speed at an unloaded time of the engine 70), and a high idle rotating speed (a highest rotating speed of the engine 70). The intermediate rotating speed Nm of the embodiment is set, for example, to 1800 min−1 (1800 rpm, 300 s−1).

An output characteristic map M (refer to FIG. 6) indicating a relationship between a rotating speed N and a torque T (a load) of the engine 70 is previously stored in the EEPROM 33 of the ECU 11. The output characteristic map M is determined by an experiment or the like. In the output characteristic map M shown in FIG. 6, the rotating speed N is employed as a transverse axis, and the torque T is employed as a vertical axis. The output characteristic map M is a region which is surrounded by a solid line Tmx drawn convex upward. The solid line Tmx is a maximum torque line which indicates a maximum torque with respect to each of the rotating speed N. In this case, if the type of the engine 70 is the same, the output characteristic maps M stored in the ECU 11 are identical (common). As shown in FIG. 6, the output characteristic map M is segmented up and down by a boundary line BL which expresses a relationship between the rotating speed N and the torque T in the case that the temperature of the exhaust gas is a renewal boundary temperature (about 300° C.). A region in an upper side with respect to the boundary line BL is a renewable region in which the PM deposited in the soot filter 54 can be oxidized and removed (in which an oxidizing action of the oxidation catalyst 53 works), and a region in a lower side is a nonrenewable region in which the PM is deposited in the soot filter 54 without being oxidized and removed.

The ECU 11 basically executes a fuel injection control which computes the torque T on the basis of the output characteristic map M, the rotating speed N which is detected by the engine speed sensor 14, and the throttle position which is detected by the throttle position sensor 16 so as to determine a target fuel injection amount, and actuates the common rail system 117 on the basis of the result of computation. In this case, the fuel injection amount is adjusted by adjusting a valve open period of each of the fuel injection valves 119, and changing an injection period into each of the injectors 115.

(4) Aspect of DPF Renewing Control

Next, a description will be given of one example of the renewing control of the DPF 50 by the ECU 11 with reference to a flow chart in FIG. 8. The control mode of the engine 70 (the control type relating to the renewal of the DPF 50) includes at least a normal drive mode which carries out a road travel and various works, a manual auxiliary renewing mode which raises the temperature of the exhaust gas in the case that the renewal switch 21 is pushed down when the clogged state of the DPF 50 becomes equal to or more than a prescribed level, and a forced renewing mode which supplies the fuel into the DPF 50 by a post injection E.

In the manual auxiliary renewing mode, an intake air amount and an exhaust gas amount are limited by closing at least one of the intake air throttle device 81 and the exhaust gas throttle device 82 to a predetermined opening degree, on the basis of the detected information of the differential pressure sensor 68. Accordingly, since the load of the engine 70 is increased, the output of the engine 70 is increased while in conjunction with this, and the temperature of the exhaust gas from the engine 70 is raised. As a result, it is possible to burn and remove the PM within the DPF 50 (the soot filter 54).

The forced renewing mode is executed in the case that a non-push-down state of the renewal switch 21 runs on for a long time and the clogged state of the DPF 50 is not improved in spite of the fact that the clogged state of the DPF 50 is equal to or more than the prescribed level. In the forced renewing mode, the temperature of the exhaust gas within the DPF 50 is raised (about 560° C.), by supplying the fuel into the DPF 50 by the post injection E, and burning the fuel by the diesel oxidation catalyst 53. As a result, it is possible to forcibly burn and remove the PM within the DPF 50 (the soot filter 54).

As is known from the description relating to each of the modes mentioned above, for example, the engine 70, the intake air throttle device 81, the exhaust gas throttle device 82 and the common rail system 117 are the members which involved in the renewing motion of the DPF 50. These elements 70, 81, 82 and 117 construct the renewing device for burning and removing the PM within the DPF 50.

Figure 8:
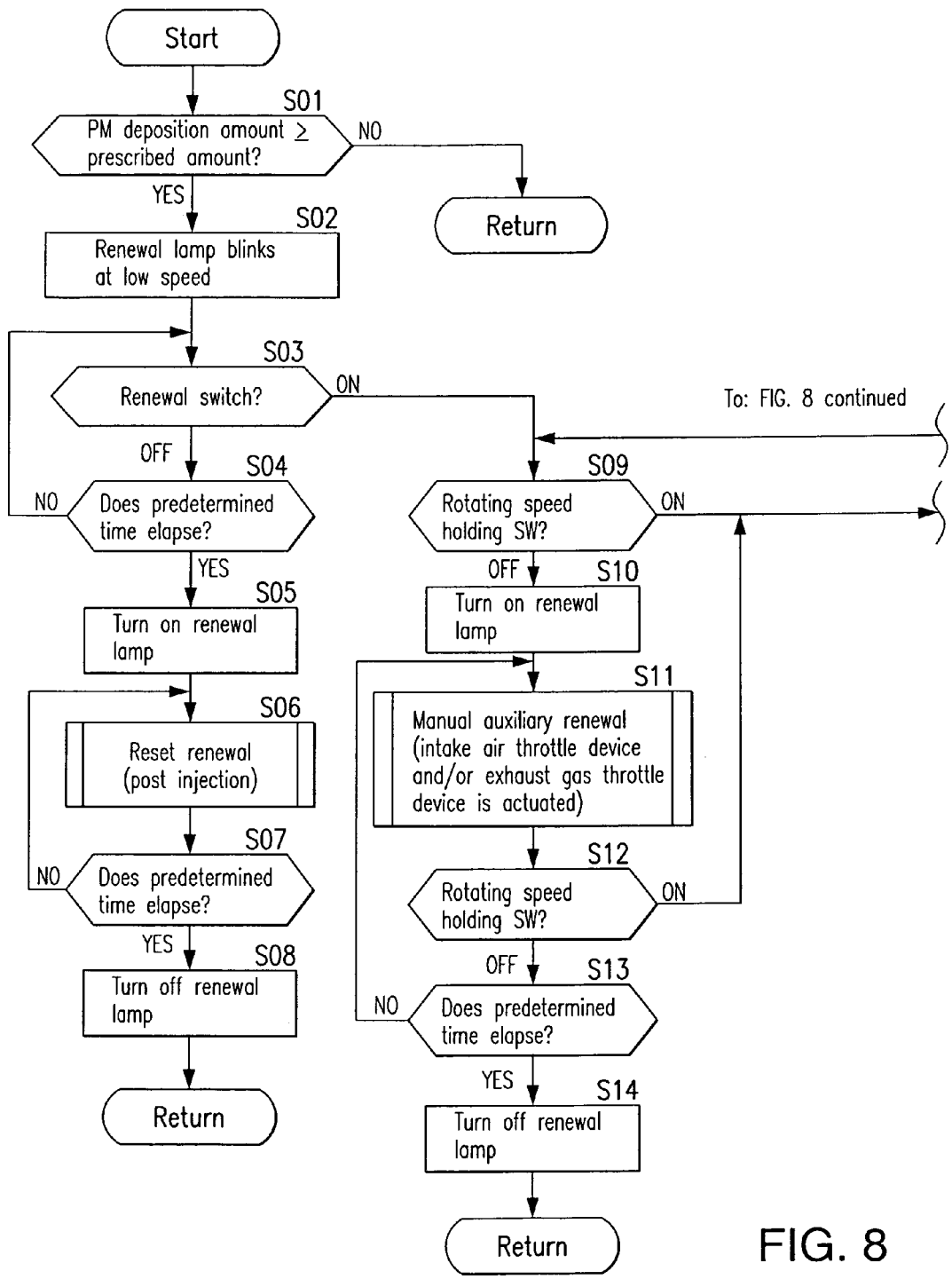
FIG. 8 is a flow chart showing a flow of a DPF renewing control.
Figure 8:
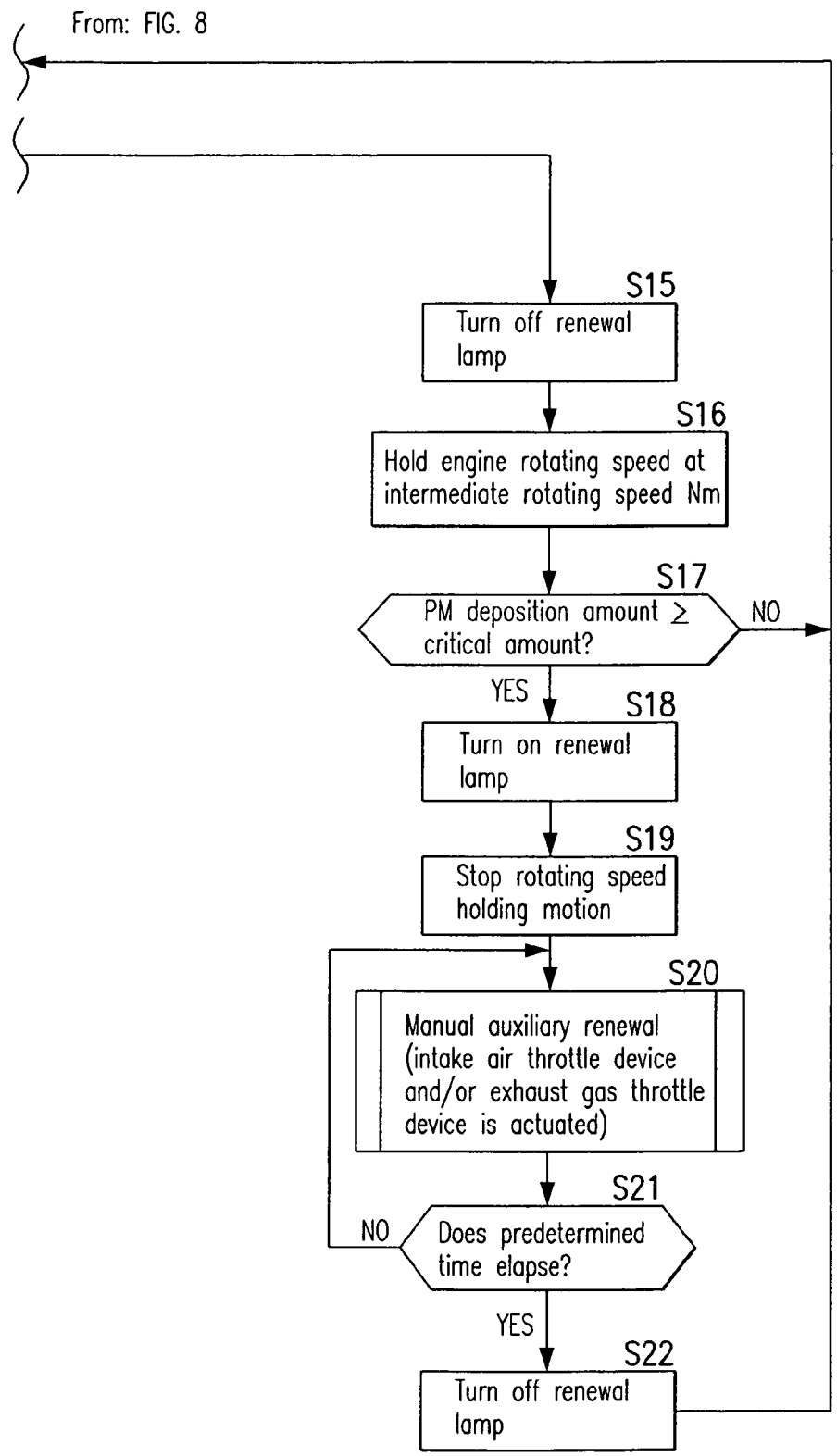

As shown in FIG. 8, each of the modes mentioned above is executed on the basis of a command of the ECU 11. In other words, an algorithm shown by a flow chart in FIG. 8 is stored in the EEPROM 33. Further, each of the modes mentioned above is executed by calling the algorithm to the RAM 34 and processing in the CPU 31.

As shown by the flow chart in FIG. 8 in the renewing control of the DPF 50, firstly, a PM deposition amount within the DPF 50 is estimated on the basis of the detected result by the differential pressure sensor 68, and determines whether the estimated result is equal to or more than a prescribed amount (a prescribed level) (S01). In the case that it is judged that the PM deposition amount is equal to or more than the prescribed amount (S01: NO), a measurement on the basis of the time information of the timer 35 is started so as to make the renewal lamp 24 blink at a low speed (S02), and advance notifies the operator of the execution of the renewing motion of the DPF 50 (the automatic auxiliary renewing mode). The prescribed amount of the embodiment is set, for example, to 8 g/l. A blinking frequency of the renewal lamp 24 is set, for example, to 1 Hz.

Next, it is determined whether the renewal switch 21 is pushed down (S03). If it is not locked in the push-down state (S03: OFF), it is determined whether a predetermined time (for example, about 30 minutes) elapses from the start of the blinking at the low speed of the renewal lamp 24 (S04). If the predetermined time does not elapse (S04: NO), the step goes back to the step S03. In the steps S03 to S04, in spite of the fact that the PM deposition amount is equal to or more than the prescribed amount, the control mode of the engine 70 is kept in the normal drive mode, and the current drive state in the engine 70 is maintained. In other words, the change to the manual auxiliary renewing mode (which may be called as the renewing motion of the DPF 50 or the actuation of the renewing device) is inhibited. The blinking frequency of the renewal lamp 24 is set in such a manner as to become shorter as an increase of the PM deposition amount within the DPF 50 increases (the renewal lamp 24 blinks at short intervals as the PM deposition amount within the DPF 50 increases). Accordingly, it is possible to call the operator's attention on the basis of a speed of the blinking of the renewal lamp 24.

In the case that the predetermined time elapses in the step S04 (S04: YES), there is assumed a state in which the renewal switch 21 is left for a long time without being pushed down in a state in which the PM deposition amount is equal to or more than the prescribed amount. The renewal lamp 24 which blinks at the low speed is turned on (S05), and the forced renewing mode is executed (S06). In the forced renewing mode, as mentioned above, the temperature of the exhaust gas within the DPF 50 is raised by supplying the fuel into the DPF 50 by the post injection E of the common rail system 117 and burning the fuel by the diesel oxidation catalyst 53. As a result, the PM within the DPF 50 is forcibly burnt and removed, and the PM collecting capacity of the DPF 50 is recovered. The forced renewing mode in the step S06 is executed, for example, for about 15 minutes (refer to S07), and the common rail system 117 finishes the post injection E after the elapse of the time, turns off the renewal lamp 24 (S08), and informs of the end of the forced renewing mode.

In this case, the step goes back to the step S03, and if the renewal switch 21 is locked in the push-down state (S03: ON), it is determined whether the rotating speed holding switch 27 is pushed down (S09). If the rotating speed holding switch 27 is not locked in the push-down state (S09: OFF), the renewal lamp 24 which blinks at the low speed is turned on (S10), and the manual auxiliary renewing mode is executed (S11).

In the manual auxiliary renewing mode, as mentioned above, the temperature of the exhaust gas is raised by increasing the load of the engine 70 on the basis of the restriction of the intake air amount or the exhaust gas amount using at least one of the intake air throttle device 81 and the exhaust gas throttle device 82, and increasing the output of the engine 70 in conjunction with this. As a result, the PM within the DPF 50 is burnt and removed, and the PM collecting capacity of the DPF 50 is recovered. The manual auxiliary renewing mode in the step S11 is executed, for example, for about 20 minutes (refer to S13), however, in a step S12 in which the manual auxiliary renewing mode is under execution (the renewing device is under operation), it is determined whether the rotating speed holding switch 27 is pushed down, if the rotating speed holding switch 27 is not locked in the pushed-state (S12: OFF), after an elapse of a predetermined time (S13: YES), the opening degrees of the intake air throttle device 81 and the exhaust; gas throttle device 82 are returned to the original state before being narrowed. Further, t the renewal lamp 24 is turned off (S14), and the end of the manual auxiliary renewing mode is informed, in the case that the rotating speed holding switch is turned on in the step S12 (S12: ON), the step goes to a step S15 mentioned later, the actuation of the renewing device is stopped, and a rotating speed holding motion (refer to S16) of the engine 70 is executed.

Turning to the step S09, if the rotating speed holding switch 27 is locked in the push-down state (S09 ON), the rotating speed holding motion (refer to S16) of the engine 70 is executed in preference to the actuation of the renewing device. In other words, the renewal lamp 24 which blinks at the low speed is turned on (S15), the injection state of the fuel to each of the cylinders is adjusted on the basis of the electronic control of the common rail system 117 without executing the manual auxiliary renewing mode and the forced renewing mode, and holds the rotating speed N of the engine 70 at the intermediate rotating speed Nm (S16).

On the basis of the control as mentioned above, even if the push-down (allowing) operation of the renewal switch 21 is carried out, it is possible to inhibit the renewing motion of the DPF 50 by the turn-on operation of the rotating speed holding switch 27. In addition, it is possible to hold the drive state of the engine 70 at a rotating speed which is suitable for a careful work which the operator executes on the basis of the engine sound. In other words, it is possible to hold the drive state of the engine 70 at the rotating speed which is suitable for the careful work, while inhibiting the renewing motion of the DPF 50, on the basis of an intention of the operator depending on the working state of the backhoe 140. Therefore in spite of the fact that it is possible to execute the renewing control of recovering the PM collecting capacity of the DPF 50, it is possible to smoothly carry out the careful work. In other words, it is possible to carry out the careful work in a concentrated manner by doing away with the renewing motion of the DPF 50 which may obstruct the careful work.

As is known particularly from a flow in the step S12, in the case that the turn-on operation of the rotating speed holding switch 27 is carried out under execution of the manual auxiliary renewing mode (operation of the renewing device), the manual auxiliary renewing mode (the actuation of the renewing device) is stopped, and the rotating speed holding motion of the engine 70 is executed. Accordingly, in the case that it is desirable to carry out the careful work even under execution of the manual auxiliary renewing mode, it is possible to easily switch to the drive state of the engine 70 which is suitable for the careful work, only by turning on the rotating speed holding switch 27. Therefore, it is possible to accurately set the drive state of the engine 70 depending on the working state (particularly, the careful work) of the backhoe 140, and it is possible to achieve an improvement of a workability in spite of the fact that it is possible to execute the renewing control of recovering the PM collecting capacity of the DPF 50.

Further, as is known from the flow in the steps S03 to S16, since the rotating speed holding motion of the engine 70 is executed in the state in which the push-down (allowing) operation of the renewal switch 21 is carried, out, the mode securely changes to the manual auxiliary renewing mode (the renewing motion of the DPF 50 by the renewing device is securely carried out), by turning off the rotating speed holding switch 27 in the case that the clogged state of the DPF 50 is equal to or more than a prescribed amount (a prescribed level). Accordingly, it is possible to extremely reduce an artificial miss such as an operation miss of the renewal switch 21, particularly at a time of the careful work, and it is possible to effectively prevent a problem that the renewing motion of the DPF 50 is not executed by the artificial miss and the DPF 50 is clogged.

Following to the step S16, the PM deposition amount within the DPF 50 is estimated on the basis of the detected result of the differential pressure sensor 68, and it is determined whether the estimated result is equal to or more than a critical amount (a critical level) (S17). The critical amount in this case is set to a value which exceeding the prescribed amount (refer to S01) mentioned above. The estimated result being equal to or more than the critical amount means a state in which the PM is excessively deposited in the DPF 50 and there is a risk of a possibility of the PM runaway combustion is high. Accordingly, in the case that it is judged that the PM deposition amount is less than the critical amount (S17: NO), the step goes back to the step S09. In the case that it is judged that the PM deposition amount is equal to or more than the critical amount (S17: YES), the renewal lamp 24 is turned on (S18), the rotating speed holding motion of the engine 70 is stopped on the basis of the electronic control of the common rail system 117 (S19), and next the manual auxiliary renewing mode is executed (S20). The manual auxiliary renewing mode in the step S20 is executed, for example, for about 20 minutes (refer to S21), and after an elapse of the predetermined time (S21: YES), the opening degrees of the intake air throttle device 81 and the exhaust gas throttle device 82 are returned to the original state before being narrowed. Further, the renewal lamp 24 is turned off (S22), the end of the manual auxiliary renewing mode is informed, and the step goes back to the step S09.

According to the control mentioned above, in the case that the clogged state of the DPF 50 becomes equal to or more than the critical amount (the critical level) under execution of the rotating speed holding motion of the engine 70, the mode smoothly changes to the manual auxiliary renewing mode (the renewing motion of the DPF 50 by the renewing device is carried out), for example, without carrying out a returning operation for changing the mode. Accordingly, it is possible to securely avoid the state in which the PM is excessively deposited within the DPF 50 while omitting a labor hour for the operation, and it is possible to prevent a malfunction of the DPF 50 and the engine 70 which is caused by the PM excessive deposition. Particularly, in the case of stopping the rotating speed holding motion of the engine 70, the operator can previously comprehend the fact that the mode changes to the manual auxiliary renewing mode (the renewing motion of the DPF 50 by the renewing device) by the actuation of the renewal lamp 24, and can previously assume the shock of the output fluctuation and the change of the engine sound which are generated thereafter. Therefore, it is possible to reduce an uncomfortable feeling of the operator which is caused by the renewing motion of the DPF 50.

(5) Summary

Figure 7:
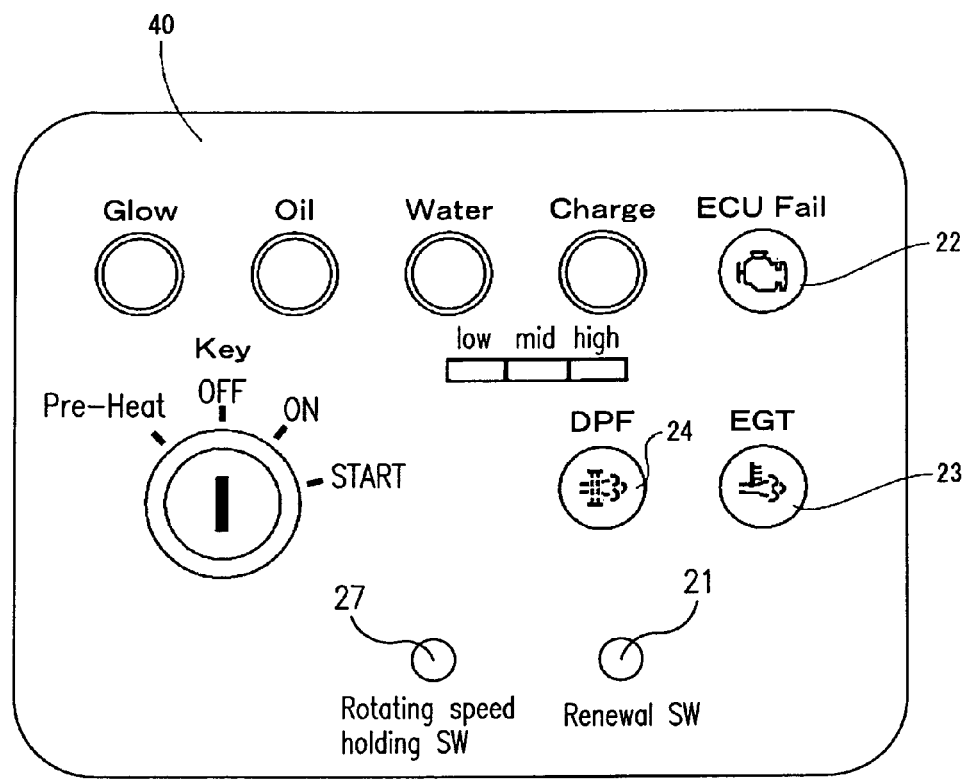
FIG. 7 is an explanatory view of an instrument panel.

As is apparent from the above description and FIG. 3, FIG. 7 and FIG. 8, since the exhaust gas purification system is provided with the engine 70 which is mounted to the working machine 140, the exhaust gas purification device 50 which is arranged in the exhaust system 77 of the engine 70, and the renewing devices 70, 81, 82 and 117 for burning and removing the particulate matter within the exhaust gas purification device 50, and the renewing devices 70, 81, 82 and 117 are operable in the case that the clogged state of the exhaust gas purification device 50 is equal to or more than the prescribed level, and the exhaust gas purification system is provided with the renewal admittance input means 21 which allows the actuation of the renewing devices 70, 81, 82 and 117, and the rotating speed holding input means 27 for holding the rotating speed N of the engine 70 to the predetermined rotating speed Nm, and in the case that the turn-on operation of the rotating speed holding input means 27 is carried out in the state in which the allowing operation of the renewal admittance input means 21 is carried out, the rotating speed holding motion of the engine 70 is executed in preference to the actuation of the renewing devices 70, 81, 82 and 117, it is possible to inhibit the renewing motion of the exhaust gas purification device 50 by the turn-on operation of the rotating speed holding input means 27, even if the allowing operation of the renewal admittance input means 21 is carried out. In addition, it is possible to hold the drive state of the engine 70 at the rotating speed which is suitable for the careful work which the operator executes on the basis of the engine sound. In other words, it is possible to hold the drive state of the engine 70, at the rotating speed which is suitable for the careful work, while inhibiting the renewing motion of the exhaust gas purification device 50, in accordance with the operator's intention depending on the working state of the working machine 140. Therefore, it is possible to smoothly carry out the careful work although it can execute a renewing control which recovers a particulate matter collecting capacity of the exhaust gas purification device 50. In other words, there can be achieved an effect that the careful work can be carried out in a concentrated manner by doing away with a defect in the renewing motion of the exhaust gas purification device 50 which may obstruct the careful work.

As is apparent from the above description and FIG. 3, FIG. 7 and FIG. 8, since the rotating speed holding motion of the engine 70 is executed in a state in which an allowing operation of the renewal admittance input means 21 is carried out, the renewing motion of the exhaust gas purification device 50 by the renewing devices 70, 81, 82 and 117 can be securely carried out only by turning off the rotating speed holding input means 27 in the case that the clogged state of the exhaust gas purification device 50 is equal to or more than the prescribed level. Accordingly, it is possible to significantly reduce an artificial mistake such as an operation miss of the renewal admittance input means 21, particularly at a time of the careful work, and there can be achieved an effect that it is possible to effectively prevent a problem that the renewing motion of the exhaust gas purification device 50 is not executed due to the artificial miss and the exhaust gas purification device 50 is clogged.

As is apparent from the above description and FIG. 3, FIG. 7 and FIG. 8, since in the case that the turn-on operation of the rotating speed holding input means 27 is carried out under actuation of the renewing devices 70, 81, 82 and 117, the actuation of the renewing devices 70, 81, 82 and 117 is stopped, and the rotating speed holding motion of the engine 70 is executed, it is possible to easily change to the drive state of the engine 70 which is suitable for the careful work, only by turning on the rotating speed holding input means 27, in the case that it is desirable to carry out the careful work even under operation of the renewing devices 70, 81, 82 and 117. Accordingly, it is possible to accurately set the drive state of the engine 70 depending on the working state (particularly the careful work) of the working machine 140, and there can be achieved an effect that it is possible to achieve an improvement of a workability although it can execute the renewing control of recovering the particulate matter collecting capacity of the exhaust gas purification device 50.

As is apparent from the above description and FIG. 3, FIG. 7 and FIG. 8, since in the case that the clogged state of the exhaust gas purification device 50 becomes equal to or more than the critical level exceeding the prescribed level under execution of the rotating speed holding motion of the engine 70, the rotating speed holding motion of the engine 70 is stopped, and the renewing devices 70, 81, 82 and 117 are actuated, it is possible to smoothly change to the renewing motion of the exhaust as purification device 50 by the renewing devices 70, 81, 82 and 117, without; carrying out a return operation, for example, for changing a mode. Therefore, there can be achieved an effect that it is possible to securely avoid a state in which the particulate matter is excessively deposited in the exhaust gas purification device 50, while omitting a labor hour of the operation, so as to prevent a malfunction of the exhaust gas purification device 50 and the engine 70 which is caused by an excessive deposition of the particulate matter.

As is apparent from the above description and FIG. 3, FIG. 7 and FIG. 8, since there is provided the renewal advance notifying means 24 which is actuated in the case that the clogged state of the exhaust gas purification device 50 becomes equal to or more than the critical level, the operator can previously comprehend a fact of changing to the renewing motion of the exhaust gas purification device 50 by the renewing devices 70, 81, 82 and 117, on the basis of the actuation of the renewal advance notifying means 24, at a time of stopping the rotating speed holding motion of the engine 70, and it is possible to previously assume the shock of the output fluctuation and the change of the engine sound which are generated thereafter. Accordingly, there can be achieved an effect that it is possible to reduce the uncomfortable feeling of the operator which is caused by the renewing motion of the exhaust gas purification device 50.

(6) Others

The present invention is not limited to the embodiments mentioned above, but can be embodies into various aspects. The structure of each of the portions is not limited to the illustrated embodiment, but can be variously changed within a range which does not deflect from the scope of the present invention.

Reference Signs List

11 ECU
21 Renewal switch (renewal admittance input means)
23 Exhaust gas temperature warning lamp (abnormally high temperature informing means)
24 Renewal lamp (renewal advanced notifying means)
26 DPF temperature sensor
27 Rotating speed holding switch (rotating speed holding input means)
50 DPF (exhaust gas purification device)
70 Engine
117 Common rail system
120 Common rail

The invention claimed is:

1. An exhaust gas purification system of a working machine having an engine mounted to the working machine, comprising:
an exhaust system of the engine outputting exhaust gas;
an exhaust gas purification device comprising a catalyst and a soot filter, the exhaust gas purification device being configured to be mounted to the engine and being coupled to the exhaust system of the engine so as to receive the exhaust gas;
an intake air throttle that determines an amount of air to be input to the engine;
an exhaust gas throttle that determines an amount of exhaust gas to be input to the exhaust gas purification device;
a controller that determines a clogged state of the soot filter, that controls the intake air throttle, that controls the exhaust gas throttle, and that has a renewing mode during which either one or both of the air intake throttle and exhaust gas throttle are controlled in a manner that increases temperature of the exhaust gas to a degree allowing particulate matter clogging the soot filter to be burned in the soot filter and exhausted from the exhaust gas purification device,
a rotating speed holding switch having a first switch state in which an input is provided to the controller indicating that the controller is to hold a rotating speed of the engine and inhibit said renewing mode, even when the controller is already in said renewing mode.

2. The exhaust gas purification system of the working machine according to claim 1, wherein when the controller determines that the soot filter is clogged at or beyond a critical level the controller enters the renewal mode, even when the rotating speed holding switch is in said first switch state.

3. The exhaust gas purification system of the working machine according to claim 2, further comprising renewal advance notifying means which is actuated when the controller determines that the soot filter is clogged at or beyond the critical level.

4. The exhaust gas purification system of claim 1, wherein the renewing mode comprises a first renewing mode and a forced renewing mode different from the first renewing mode, and wherein during said forced renewing mode the controller is configured to control a post injection of fuel to the engine so that fuel is supplied into the exhaust gas purification device through the exhaust system causing burning of fuel in the exhaust gas purification device and burning of the particulate matter clogging the soot filter.

5. The exhaust gas purification system of claim 4, wherein the controller enters the forced renewing mode when the controller determines that the soot filter is clogged at or beyond the critical level.

* * * * *